(12) United States Patent
Lee

(10) Patent No.: US 10,468,049 B2
(45) Date of Patent: Nov. 5, 2019

(54) SCREAM DETECTION METHOD AND APPARATUS THEREFOR

(71) Applicant: SAFERWAY MOBILE, INC., San Francisco, CA (US)

(72) Inventor: Seon Jeong Lee, Busan (KR)

(73) Assignee: SAFERWAY MOBILE, INC, San Francisco, CA (US)

( * ) Notice: Subject to any disclaimer, the term of this patent is extended or adjusted under 35 U.S.C. 154(b) by 0 days.

(21) Appl. No.: 16/075,169

(22) PCT Filed: Mar. 24, 2016

(86) PCT No.: PCT/KR2016/003006
§ 371 (c)(1),
(2) Date: Aug. 3, 2018

(87) PCT Pub. No.: WO2017/135507
PCT Pub. Date: Aug. 10, 2017

(65) Prior Publication Data
US 2019/0035419 A1    Jan. 31, 2019

(30) Foreign Application Priority Data
Feb. 3, 2016    (KR) .................. 10-2016-0013423

(51) Int. Cl.
| | | |
|---|---|---|
| *G10L 15/00* | (2013.01) | |
| *G10L 25/45* | (2013.01) | |
| *G10L 15/20* | (2006.01) | |
| *G06F 17/14* | (2006.01) | |
| *G10L 25/90* | (2013.01) | |
| *G10L 25/93* | (2013.01) | |
| *G10L 25/51* | (2013.01) | |
| *G10L 19/02* | (2013.01) | |
| *G10L 21/038* | (2013.01) | |
| *G10L 15/30* | (2013.01) | |

(Continued)

(52) U.S. Cl.
CPC ............ *G10L 25/45* (2013.01); *G06F 17/142* (2013.01); *G10L 15/20* (2013.01); *G10L 25/51* (2013.01); *G10L 25/90* (2013.01); *G10L 25/93* (2013.01); *G10L 15/02* (2013.01); *G10L 15/30* (2013.01); *G10L 19/02* (2013.01); *G10L 21/038* (2013.01); *G10L 25/18* (2013.01); *G10L 2025/937* (2013.01)

(58) Field of Classification Search
CPC combination set(s) only.
See application file for complete search history.

(56) References Cited

FOREIGN PATENT DOCUMENTS

| | | |
|---|---|---|
| JP | 2008-049462 | 3/2008 |
| JP | 2011-053557 | 3/2011 |

(Continued)

*Primary Examiner* — Vu B Hang
(74) *Attorney, Agent, or Firm* — Stuart H. Mayer; Mayer & Williams PC

(57) ABSTRACT

A scream determination method for determining whether a window signal, selected by a window having a predetermined time length, among collected an audio signal includes a signal corresponding to the scream of a person, performs a process for each section, the process comprising the steps of: generating "FFT signals" and "S-FFT signals"; determining whether the number of points having a predetermined fifth reference value among the S-FFT signals satisfies a predetermined third condition; and determining whether energy patterns of predetermined specific frequency bands satisfy a predetermined fifth condition.

5 Claims, 17 Drawing Sheets

(51) Int. Cl.
    *G10L 15/02*     (2006.01)
    *G10L 25/18*     (2013.01)

(56) References Cited

FOREIGN PATENT DOCUMENTS

| KR | 1020070017621 | 2/2007 |
| KR | 1009528940000 | 1/2010 |
| KR | 1015781080000 | 12/2015 |

SCREAM DETECTION METHOD AND APPARATUS THEREFOR

TECHNICAL FIELD

The present invention relates to a signal processing technique in an electronic field, and more particularly, to a technique capable of detecting a human scream in an audio signal.

BACKGROUND ART

There is a growing concern about the security of dangerous situations such as pickpocketing, robbery, and sex crimes in public places such as downtown, traffic roads, and alleyway parks. As a means for preventing the occurrence of such a dangerous situation, it is possible to provide a service such as a so-called 'secure home return service'. The secure home return service may include a process of manually or automatically notifying others of the emergency by using a function provided by the mobile wireless terminal when an emergency occurs. In order to automatically notify the emergency situation, the emergency situation should be recognized automatically.

Screaming may occur in an emergency situation. If this scream is able to be distinguished from the sound other than the scream, the emergency situation may be recognized automatically. In order to determine whether a signal acquired by a microphone corresponds to a scream, it is necessary to perform a frequency analysis on the signal. A considerable amount of computation may be required for frequency analysis. Therefore, in a battery-operated device such as a mobile wireless terminal such as a smart phone, when it is determined whether screaming is continued by using the frequency analysis method according to the related art, the use time of the smart phone may be greatly shortened. In this case, even if an application for determining screaming is provided, it may be disregarded by the users.

Therefore, it is necessary to reduce the battery consumption by reducing the calculation amount to recognize the screaming.

DISCLOSURE OF THE INVENTION

Technical Problem

In order to solve the above-mentioned problems, the present invention provides a method for quickly determining whether a person is screaming when a dangerous situation occurs. Through this method, the police and/or predetermined persons may be contacted quickly in applications of the smartphone, for example.

Technical Solution

According to an embodiment of the present invention, provided is a scream determination method for determining whether a window signal selected by a window having a predetermined time length among a collected audio signal includes a signal corresponding to a human scream, the method configured to perform a section-by-section process including: performing a Fourier transform on a section signal included in the window signal and generating an FFT signal (S19), which is a frequency domain signal obtained by the Fourier transform; smoothing a shape of the FFT signal, generating an 'S-FFT signal', which is a frequency domain signal obtained by the smoothing, and determining whether a number of points having a predetermined fifth reference value among the S-FFT signals satisfies a predetermined third condition (S26 to S29); and determining whether an energy pattern of predetermined specific frequency bands satisfies a predetermined fifth condition (S34, S35, S35-1). The determining of whether the fifth condition is satisfied is performed only when the third condition is satisfied, and only if the fifth condition is satisfied, it is determined that the section signal includes a signal corresponding to a scream, and if not, it is determined that the section signal does not include a signal corresponding to a scream.

At this time, the method may further include determining if a statistical value of the section signal satisfies a first predetermined condition before the generating of the 'FFT signal' (S15, S17), wherein the generating of the FFT signal is performed only if the section signal satisfies the first condition.

At this time, the method may further include normalizing a size of the FFT signal between the generating of the 'FFT signal' and the generating of the 'S-FFT signal' (S22).

At this time, the method may further include determining whether a maximum value of the FFT signal is less than or equal to a first predetermined reference value between the generating of the 'FFT signal' and the normalizing operation (S21), wherein the normalizing operation may be performed only when the maximum value of the FFT signal is equal to or less than the first reference value.

At this time, the section-by-section process may be executed on the N section signals that are consecutively defined in a time domain to determine whether each of the N section signals includes a signal corresponding to a scream. At this time, a scream recognition process may be performed, which includes determining whether a time duration during which a center frequency has been decreased is longer than a time duration during which the center frequency has been increased when it is determined that the center frequency of a fundamental frequency band in which energy is concentrated among the N section signals is increased and then decreased from past to present (S40), wherein It may be determined that a scream occurs only when the time duration during which the center frequency has been decreased is longer than the time duration during which the center frequency has been increased.

At this time, before the determining of whether the time duration during which the center frequency has been decreased is longer than the time duration during which the center frequency has been increased, the scream recognition process further includes; determining whether there are M or more section signals including information on the scream of a person among the N section signals (where N>M) (S37); and determining whether there are P or more consecutive section signals on a time axis, which are determined that the information on the scream of a person is not included among the N section signals, when it is determined that there are the M or more section signals (S38). At this time, the determining of whether the time duration during which the center frequency has been decreased is longer than the time duration during which the center frequency has been increased is executed only when it is determined that there are no P or more consecutive section signals on the time axis, which are determined that the information on the scream of a person is not included among the N section signals.

According to an embodiment of the present invention, provided is a scream determination device including a processing unit configured to determine whether a window signal selected by a window having a predetermined time length among a collected audio signal includes a signal corresponding to a human scream. At this time, the processing unit is configured to: perform a Fourier transform on a section signal included in the window signal and generating an FFT signal (S19), which is a frequency domain signal obtained by the Fourier transform; smooth a shape of the FFT signal, generating an 'S-FFT signal', which is a frequency domain signal obtained by the smoothing, and determine whether a number of points having a predetermined fifth reference value among the S-FFT signals satisfies a predetermined third condition (S26~S29); and determine whether an energy pattern of predetermined specific frequency bands satisfies a predetermined fifth condition (S34, S35, S35-1). At this time, the determining of whether the fifth condition is satisfied is performed only when the third condition is satisfied, and only if the fifth condition is satisfied, it is determined that the section signal includes a signal corresponding to a scream, and if not, it is determined that the section signal does not include a signal corresponding to a scream.

At this time, the processing unit is further configured to process determining whether a statistical value of the section signal satisfies a first predetermined condition before the generating of the 'FFT signal' (S15, S17), wherein the generating of the FFT signal is performed only if the section signal satisfies the first condition.

At this time, after the generating of the FFT signal, the processing unit is configured to process: normalizing a size of the FFT signal; and determining whether a maximum value of the FFT signal is less than or equal to a first predetermined reference value (S21), wherein the normalizing operation is performed only when the maximum value of the FFT signal is equal to or less than the first reference value.

At this time, the processing unit is configured to determine whether each of the N section signals includes a signal corresponding to a scream by executing the section-by-section process on the N section signals that are consecutively defined in a time domain, and is configured to perform a scream recognition process including: determining whether a time duration during which a center frequency has been decreased is longer than a time duration during which the center frequency has been increased when it is determined that the center frequency of a fundamental frequency band in which energy is concentrated among the N section signals is increased and then decreased from past to present, wherein It is determined that a scream occurs only when the time duration during which the center frequency has been decreased is longer than the time duration during which the center frequency has been increased.

According to another aspect of the present invention, there is provided a scream determination method for performing a section-by-section process for determining whether or not each of N consecutive section signals defined in a time domain includes a signal corresponding to screaming. Also, when it is determined that the center frequency of the fundamental frequency band in which energy among the N section signals is concentrated increases from past to present and then decreases, it is configured to perform a scream recognition process including determining whether or not the time duration during which the center frequency decreases is longer than the time duration during which the center frequency increases (S40), and it is determined that screaming occurs only when the time duration during which the center frequency decreases is longer than the time duration during which the center frequency increases.

At this time, before the determining of whether the time duration during which the center frequency decreases is longer than the time duration during which the center frequency increases, the scream recognition process further includes determining whether there are M or more section signals including information on the scream of a person among the N section signals (N>M) (S37) and determining whether or not there are P or more consecutive section signals determined to contain no information on the scream of a person among the N section signals on the time axis (S38). Then, the determining of whether the time duration during which the center frequency decreases is longer than the time duration during which the center frequency increases may be executed only when it is determined that the section signals determined to not include the information on the scream of a person among the N section signals are not present consecutively more than P times on the time axis.

According to another aspect of the present invention, there is provided a scream determination device including a processing unit for performing a section-by-section process for determining whether or not each of N consecutive section signals defined in a time domain includes a signal corresponding to screaming. At this time, when it is determined that the center frequency of the fundamental frequency band in which energy among the N section signals is concentrated increases from past to present and then decreases, the processing unit is configured to perform a scream recognition process including determining whether or not the time duration during which the center frequency decreases is longer than the time duration during which the center frequency increases (S40), and it is determined that screaming occurs only when the time duration during which the center frequency decreases is longer than the time duration during which the center frequency increases.

At this time, before the determining of whether the time duration during which the center frequency decreases is longer than the time duration during which the center frequency increases, the scream recognition process further includes determining whether there are M or more section signals including information on the scream of a person among the N section signals (N>M) (S37) and determining whether or not there are P or more consecutive section signals determined to contain no information on the scream of a person among the N section signals on the time axis (S38). Then, the determining of whether the time duration during which the center frequency decreases is longer than the time duration during which the center frequency increases may be executed only when it is determined that the section signals determined to not include the information on the scream of a person among the N section signals are not present consecutively more than P times on the time axis.

According to another aspect of the present invention, there is provided a scream detection method for detecting a scream using a section-by-section process including (1) determining whether a window signal divided into two section signals is a human voice; (2) testing each of the section signals based on a statistical value of each section signal according to a predetermined first condition when the window signal is determined to be human voice; (3) performing a Fourier transform on the section signal that has passed the test among the two section signals; and (4) determining whether there is energy above a predetermined sixth level in a frequency band associated with a scream of a person among the frequency bands of the section signal in which the Fourier transform has been performed, and a scream recognition process. At this time, the section-by-section process determines that the window signal is not a human voice and that the two section signals do not contain information about a human scream, determines that the section signal that does not pass the test according to the predetermined first condition among the two section signals does not include information on the scream of the person, determines that the information about the scream of a person is not included in the section signal in which the energy level of the sixth level or higher does not exist in the frequency band associated with the scream of the person, and determines that information on the scream of a person is included in the section signal in which the energy level of the predetermined level 6 or higher exists in the frequency band associated with the scream of the person. And, the scream recognition process includes determining whether or not information on screams of a person is included in each of a plurality of the section signals defined for the audio signal by performing the section-by-section process for the audio signal of a predetermined length detected by the microphone and when section signals including information on the scream of a person among the plurality of section signals are present a predetermined number of times or more and the section signals determined to not include the information on the scream of the person among the plurality of section signals do not exist continuously over the predetermined fourth number of times on the time axis, determining that a scream of a person is included in the audio signal.

At this time, the determining of whether the window signal is the human voice may include changing the signal value of the silence interval of the window signal to '0', and determining whether the energy of the window signal corresponds to voice energy, and if it is determined that the energy of the window signal does not correspond to the voice energy, the section-by-section process may be terminated.

At this time, the testing of each section signal according to a predetermined first condition based on a statistical value of each section signal includes selecting a section signal that has passed the test as a candidate section signal, dividing the candidate section of the candidate section signal into a predetermined fifth number of parts overlapping with each other in the time axis and having the same time length, determining whether the energy value and the statistical value of each of the parts satisfy a predetermined second condition, and determining whether or not parts of the predetermined fifth number of parts included in each of the candidate sections are determined to be not a voice. And, when a predetermined number of parts of the predetermined fifth number of parts included in each candidate section are not consecutively determined to be voices, the section-by-section process may be terminated.

At this time, after the performing of the Fourier transform, a first maximum value MAX and a first minimum value MIN are detected for the first signal SS1 on which the Fourier transform is performed to determine whether the first maximum value is equal to or greater than a predetermined first reference value, and if it is determined that the first maximum value is equal to or greater than the predetermined first reference value, the section-by-section process is terminated, and when it is determined that the first maximum value is not equal to or greater than the predetermined first reference value, a first normalization is performed such that the first maximum value and the first minimum value are a second maximum value 1 and a second maximum value 0 of a first predetermined normalization interval, respectively At this time, dividing the first signal SS1 into P sections of a predetermined number (160) based on a frequency axis, retrieving an inflection point of the first signal, defining a frequency value and a size of the inflection point as a key point and storing the key point in a first key point array, defining a difference in magnitude between two consecutive keypoints based on the frequency axis as a depth and storing the depth in a first depth array; and updating the first depth array by removing a pair of keypoints having an absolute value of the depth less than a predetermined second reference value from the first depth array may be further included.

At this time, determining P intervals between two consecutive keypoints in which the absolute value of the depth is equal to or greater than a predetermined third reference value as valid P intervals, performing a second normalization on the valid P interval in which the depth of the valid P intervals is smaller than a predetermined fourth reference value is such that the maximum value M1 and the minimum value m1 of the first signal within the valid period P are respectively set to a predetermined maximum value MAX1 and minimum value MIN1 of the second normalization interval, updating the size of the keypoints included in the valid P period in which the second normalization is performed to a normalized value and storing the updated keypoints in the second keypoint array in the first keypoint array, generating a second signal (SS2) by connecting keypoints stored in the second keypoint array, checking the number of R-crossing points having a predetermined fifth reference value of the second signal, and determining whether the number of points satisfies a predetermined third condition may be included. And if the number of R-crossing points does not satisfy the predetermined third condition, the section-by-section process may be terminated.

At this time, the determining of whether there is the energy of the sixth level or higher in the frequency band associated with the scream of the person among the frequency bands of the section signal on which the Fourier transform is performed includes dividing each of the predetermined sixth number (160) of P sections of the first signal into sub-P sections, generating a vector using a value at a minimum frequency fmi of the first signal and a value at a maximum frequency fma of the first signal in the sub-P section, calculating an energy of a predetermined first frequency band using absolute values of vectors included in the predetermined first frequency band, determining, in the first signal, whether an energy pattern between specific frequency bands satisfies a predetermined fourth condition; and comparing the energy pattern for each frequency in the candidate section NS1 with the frequency pattern for each frequency in the immediately preceding section NS2 defined immediately before the candidate section and determining whether the energy pattern is continuous on the time axis, and if it is determined that it is not continuous on the time axis, the section-by-section process may be terminated.

At this time, comparing the energy pattern for each frequency in the candidate section NS1 with the frequency pattern for each frequency in the immediately preceding section NS2 defined immediately before the candidate section and determining whether the energy pattern is continuous on the time axis include determining whether a difference between first center frequency cf11 of the band having the energy of the predetermined sixth level or higher in the immediately preceding section NS2 and a second center frequency cf12 of the band having the energy of the predetermined sixth level or higher in the candidate section is less than a predetermined seventh reference value and if the difference between the first center frequency cf11 and the second center frequency cf12 is smaller than the predetermined seventh reference value, the section-by-section process may be terminated.

At this time, comparing the energy pattern for each frequency in the candidate section NS1 with the frequency pattern for each frequency in the immediately preceding section NS2 defined immediately before the candidate section and determining whether the energy pattern is continuous on the time axis include determining whether a difference between a first energy ratio E1 between bands having energy above the predetermined sixth level in the immediately preceding section NS2 and a second energy ratio E2 between the bands having the energy of the predetermined sixth level or higher in the candidate section is less than a predetermined eighth reference value, and if the difference between the first energy ratio E1 and the second energy ratio E2 is less than the predetermined eighth reference value, the section-by-section process may be terminated.

Advantageous Effects

According to the present invention, the present invention provides a method for quickly determining whether a person is screaming when a dangerous situation occurs.

MODE FOR CARRYING OUT THE INVENTION

Hereinafter, embodiments of the present invention will be described with reference to the accompanying drawings. However, the present invention is not limited to the embodiments described herein, but may be implemented in various other forms. The terminology used herein is for the purpose of understanding the embodiments and is not intended to limit the scope of the present invention. In addition, the singular forms used below include plural forms unless the phrases expressly have the opposite meaning.

Figure 1:
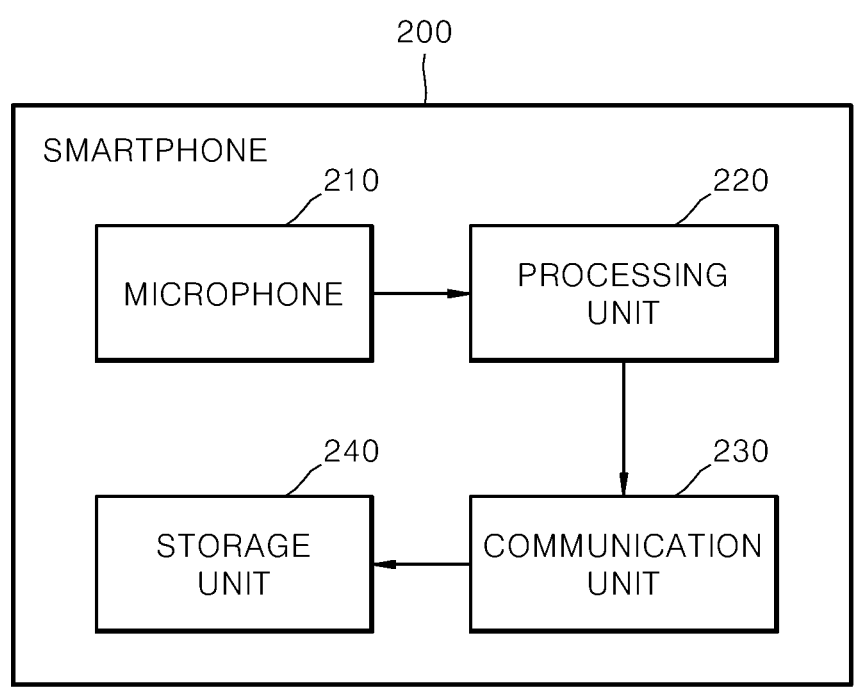
FIG. 1 is a block diagram of a smartphone according to an embodiment of the present invention.

FIG. 1 is a block diagram of a smartphone (terminal) according to an embodiment of the present invention.

A smartphone (terminal) 200 may include a microphone 210, a processing unit 220, a storage unit 230, and a communication unit 240. When an application for screaming detection (hereinafter referred to as an app) is executed in the smartphone, the app may be configured to operate in the background. The microphone 210 may be provided to collect an audio signal sound, and the audio signal collected by the microphone 210 may be inputted to the processing unit 220. At this time, the processing unit 220 may be configured to execute the steps of FIGS. 2A to 2D to be described later. The execution result of the processing unit 220 may be stored in the storage unit 230 and the result may be transmitted to the communication unit 240 when the processing unit 220 detects a scream. The communication unit 240 may be configured to transmit a determination on whether screaming is detected to the server 300.

Figure 2A:
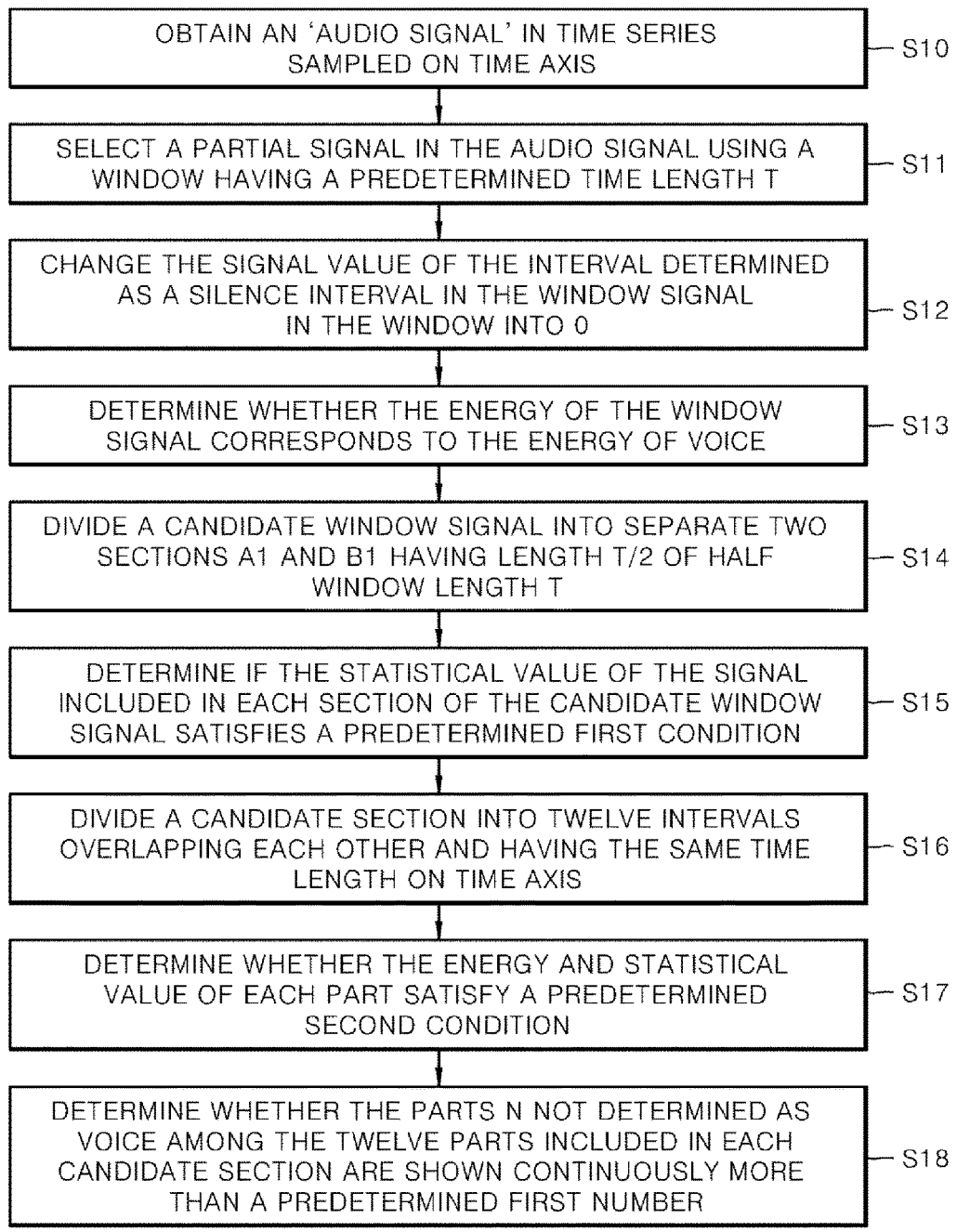
FIGS. 2A to 2C are flowcharts illustrating a series of execution processes for a 'section-by-section process' according to an embodiment of the present invention and FIG. 2D is a flowchart illustrating a series of execution processes for a 'scream recognition process' according to an embodiment of the present invention.
Figure 2B:
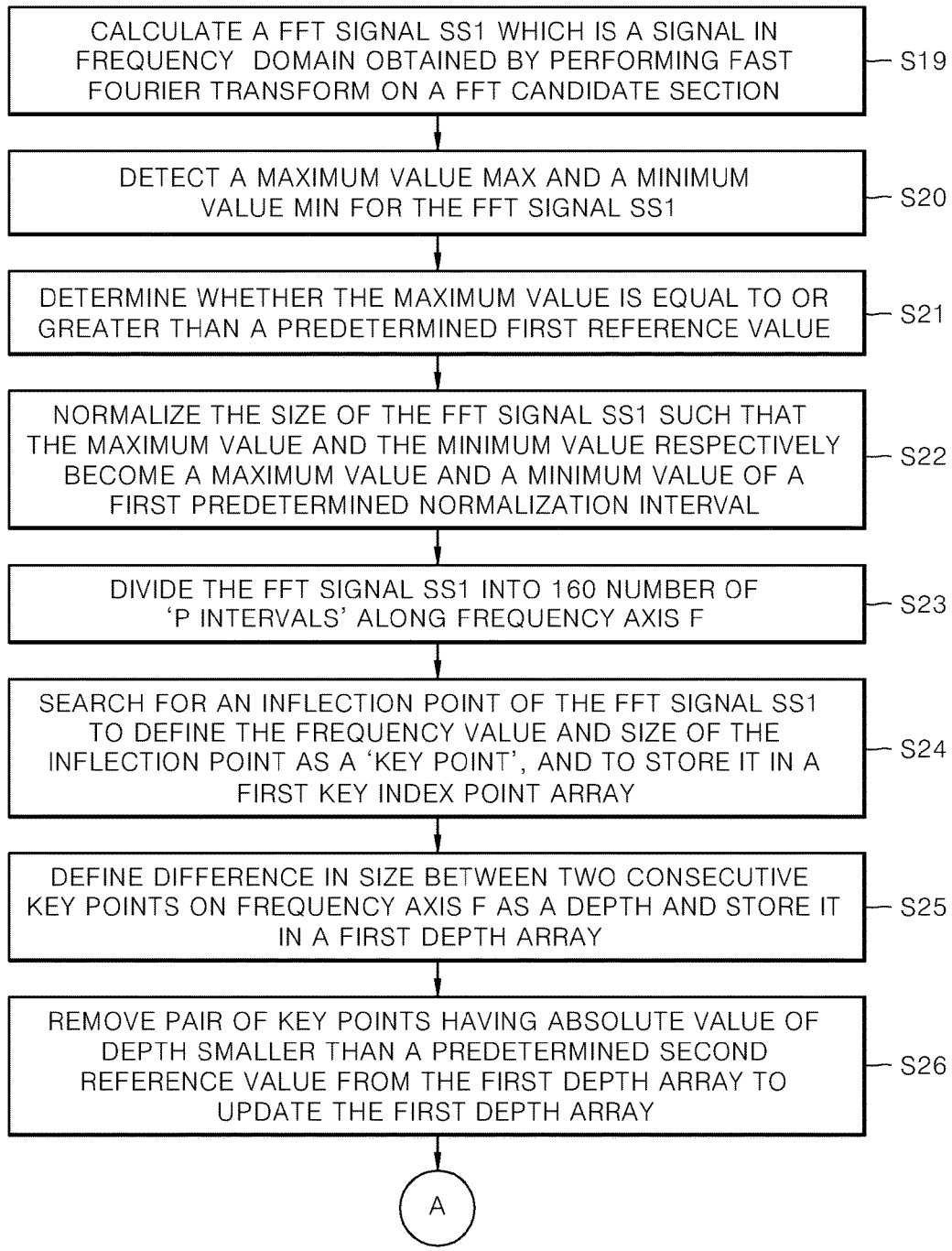
Figure 2B:
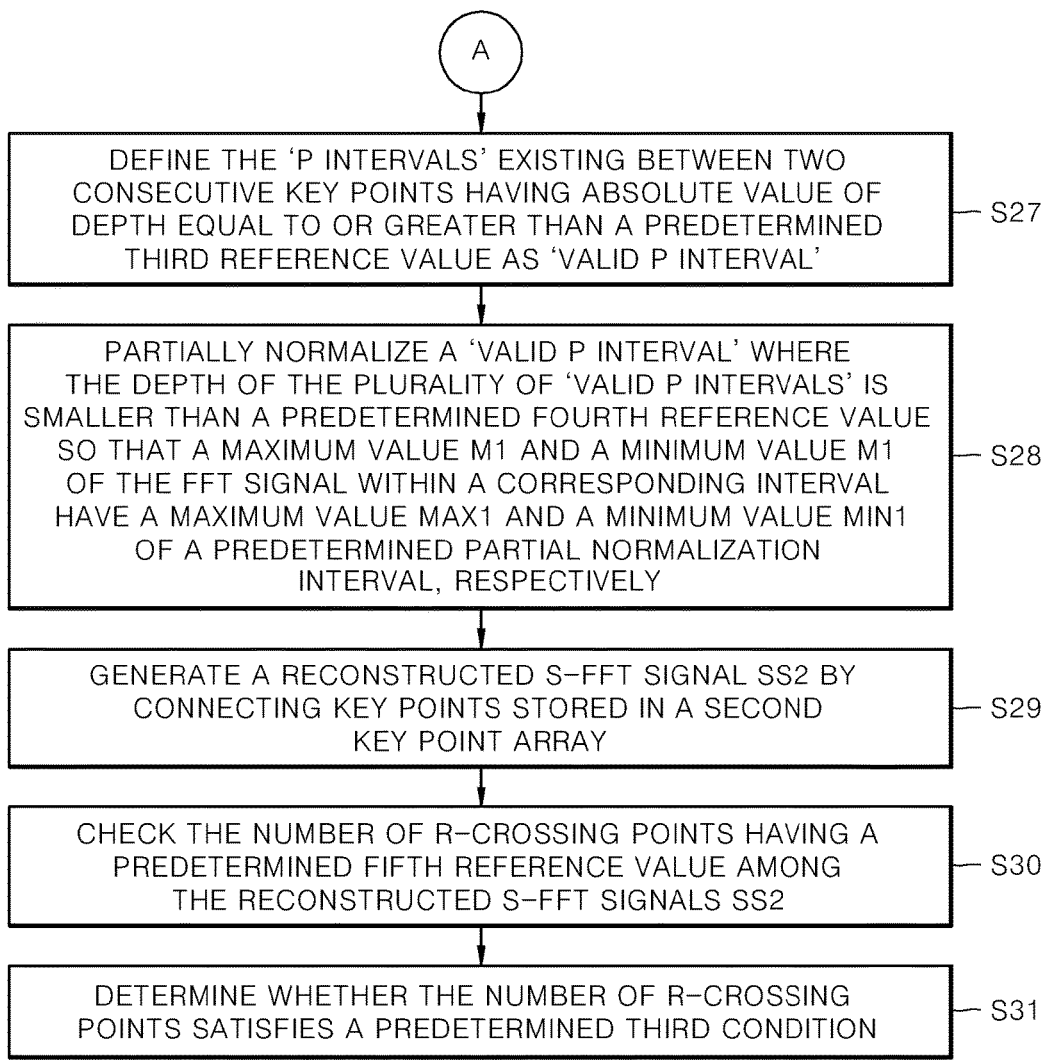
Figure 2C:
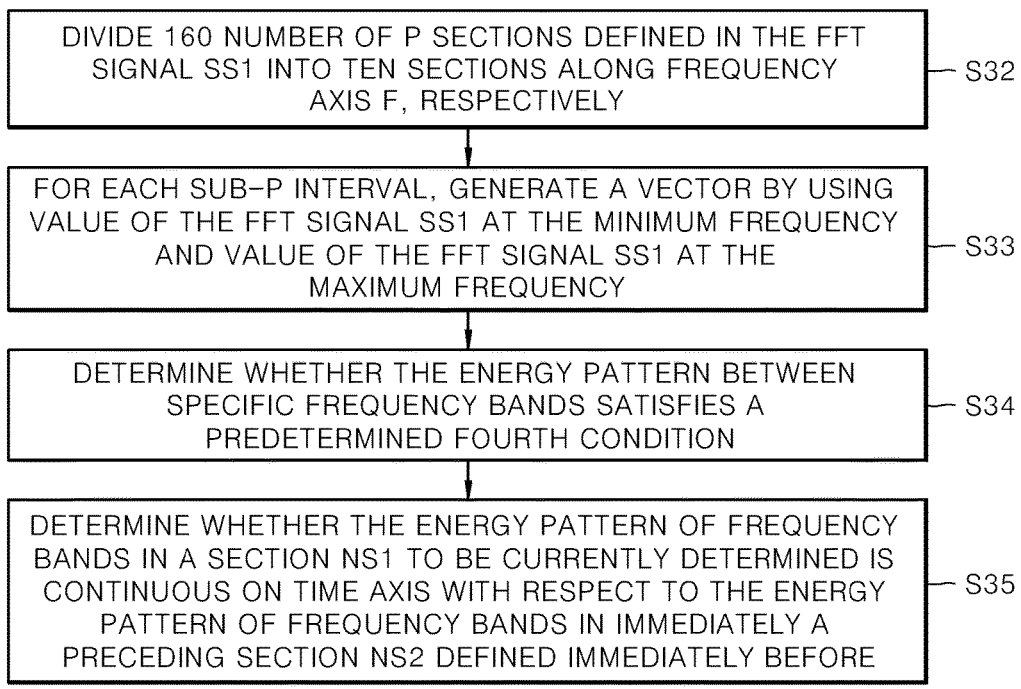

FIGS. 2A to 2C are flowcharts illustrating a series of execution processes for a 'section-by-section process' according to an embodiment of the present invention.

Figure 2D:
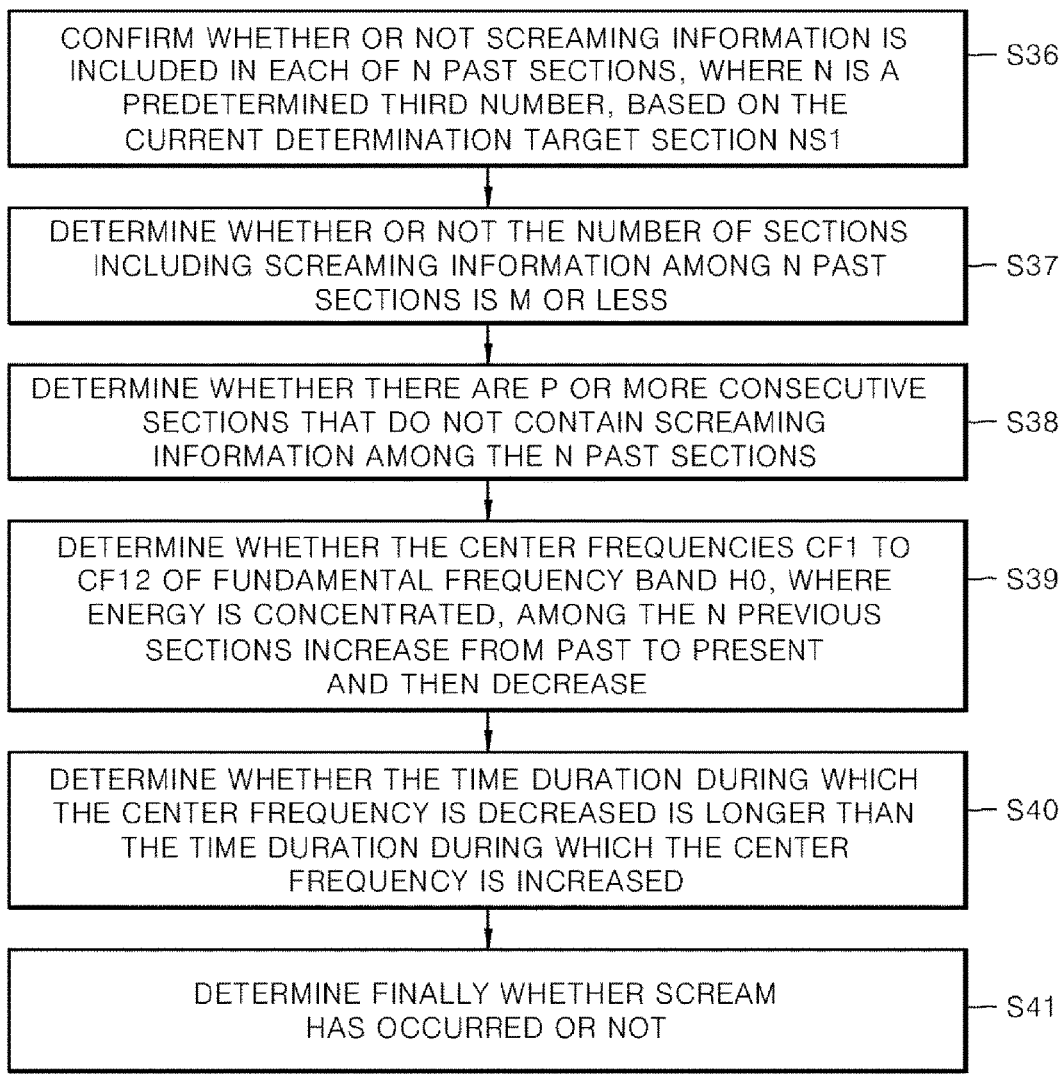

FIG. 2D is a flowchart illustrating a series of execution processes for a 'scream recognition process' according to an embodiment of the present invention.

<Section-by-Section Process>

FIG. 2A shows a first execution step for a section-by-section process according to an embodiment of the present invention.

Figure 3:
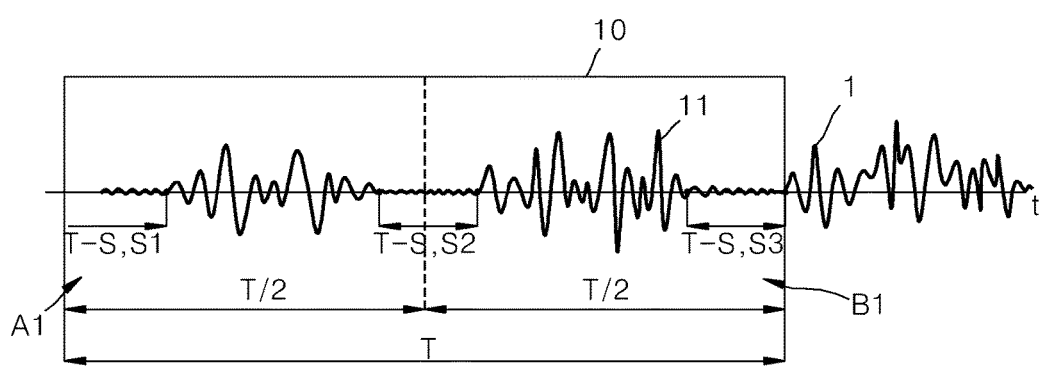
FIG. 3 is a view for explaining a process of executing a section-by-section process for scream detection according to an embodiment of the present invention.

FIG. 3 is a view for explaining a process of executing a section-by-section process for scream detection according to an embodiment of the present invention.

It will be easily understood that each of the steps described below may be performed by digital processing in a processing unit (e.g., processing unit 220) of a mobile wireless terminal, such as a smartphone.

For each section defined in the section-by-section process described below, values of F or S may be matched. For this purpose, for example, if k sections are defined, an array with k elements may be defined. When the section-by-section process is performed for each of the sections, F or S may be stored in the corresponding element of the array.

In step S10, a time series 'audio signal 1' sampled on the time axis may be obtained. The horizontal and vertical axes of FIG. 3 may all have discrete values.

In step S11, a part of the audio signal 1 may be selected using the window 10 having the predetermined time length T. The selected signal may be referred to as a 'window signal 11'.

In step S12, the signal value of the interval determined as the silence interval T_S, S1 to S3 of the 'window signal 11' may be changed to '0'.

In step S13, it may be determined whether the energy of the 'window signal 11' corresponds to the energy of the sound.

At this time, if the energy of the 'window signal 11' does not correspond to the energy of the voice, it may be regarded that there is no screaming information, and 'F (=false)' may be outputted, and the section-by-section process may be terminated. Here, 'F' is a symbol indicating that the window signal is not related to screaming.

Unlike this, if the energy of the 'window signal 11' corresponds to the energy of the voice, the step S14 may be executed and the 'window signal 11' may be regarded as passing the step S13. Then, the 'window signal 11' passing the step S13 may be referred to as a 'candidate window signal'.

In step S14, the 'candidate window signal' may be divided into two distinct sections A1 and B1 having a length (T/2) of half the length T of the 'window signal'.

Figure 4:
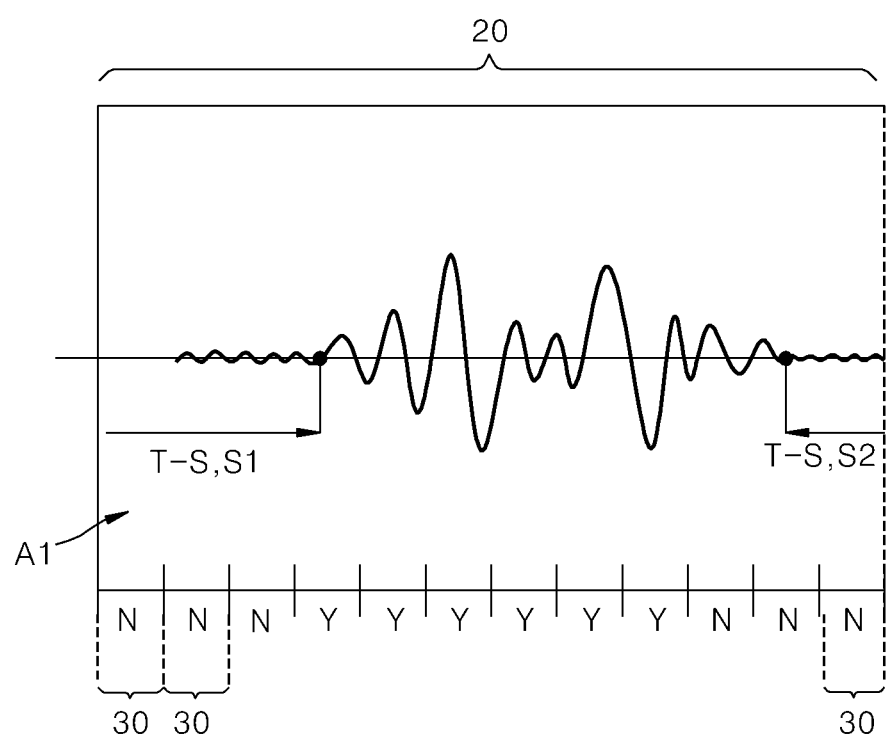
FIG. 4 is a view for explaining a 'section' defined according to an embodiment of the present invention.

FIG. 4 is a view for explaining a 'section' defined according to an embodiment of the present invention.

In step S15, it is possible to determine whether the statistical value of the signal included in each section (for example, A1) of the 'candidate window signal' classified in step S14 satisfies the predetermined first condition. At this time, the statistical value may be a concept including an average, variance, and standard deviation.

At this time, if the statistical value does not satisfy the predetermined first condition, 'F' may be outputted for each section that is not satisfied, and the section-by-section process may be terminated. Here, 'F' is a symbol indicating that the section corresponding thereto is not related to screaming.

Unlike this, for the section to be determined, if the statistical value satisfies the predetermined first condition, step S16 may be executed, and the section may be regarded as passing the step S15. And, a section that passes step S15 may be referred to as a 'candidate section 20'.

In step S16, the 'candidate section 20' may be divided into twelve intervals overlapping with each other on the time axis and having the same time length, and the divided intervals may be defined as 'part 30'. FIG. 4 shows an example where the overlap length is zero for convenience.

In step S17, it is possible to determine whether the energy and statistical values of the respective 'parts' satisfy a predetermined second condition.

At this time, if the energy and the statistical value of each 'part' do not satisfy the predetermined second condition, it may be determined that each 'part' is not related to screaming.

Unlike this, if the energy and the statistical value of each 'part' satisfy the predetermined second condition, it may be determined that each 'part' is related to the voice. At this time, whether or not the audio is related to each part may be outputted as (Y, N). The 'part' related to the voice corresponds to the symbol 'Y', and the part not corresponding to the voice corresponds to the symbol 'N'.

In step S18, it is determined whether or not parts N, which are determined to be not the voice, out of the 12 'parts 30' included in each 'candidate section 20' are shown continuously more than a predetermined first number (for example, three).

At this time, if parts N, which are determined to be not the voice, out of the 12 'parts 30' included in each 'candidate section 20' are shown continuously more than the predetermined first number, 'F' may be outputted and the section-by-section process may be terminated. Here, 'F' is a symbol indicating that the corresponding section is not related to screaming.

Unlike this, it may be determined that the 'candidate section' where the parts N determined not to be voice are not consecutively displayed more than the predetermined first number includes a voice that may include screaming, and may be regarded as passing step S18. The passed 'candidate section' may be hereinafter referred to as an 'FFT candidate section'. The step S19 may be executed for the 'FFT candidate section'. The 'FFT candidate section' may refer to a voice signal that has passed all of the above-described steps S10 to S18.

In the example shown in FIG. 4, if the predetermined first number is defined as 3, since the number of parts N determined to be not a voice is more than three, 'F' may be outputted and the section-by-section process may be terminated.

FIG. 2B shows a second execution step according to an embodiment of the present invention.

Figure 5A:
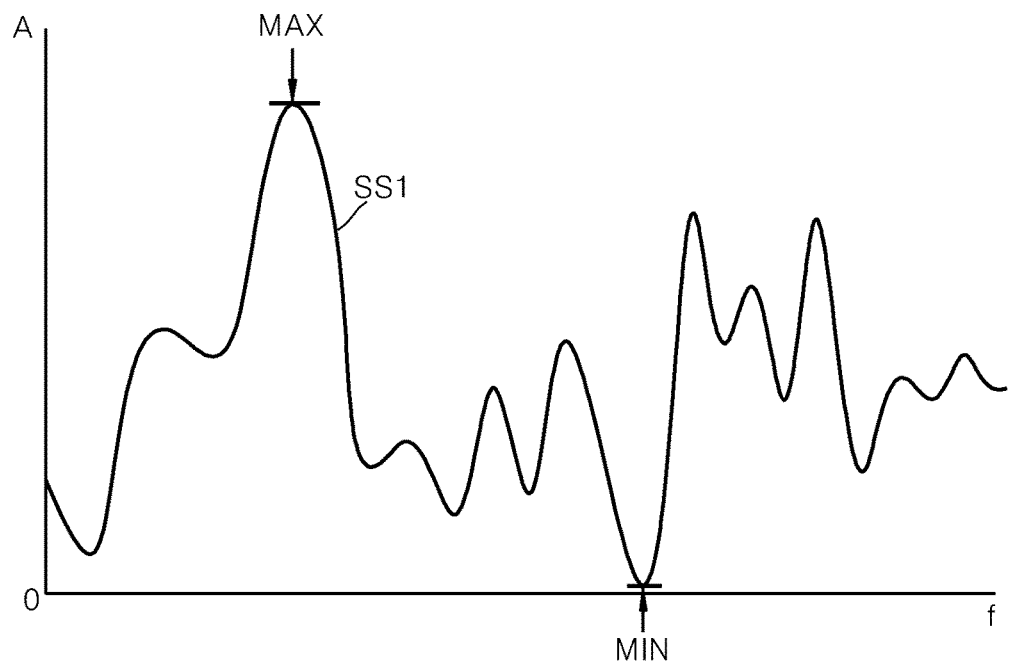
FIG. 5A is a graph showing an 'FFT signal' obtained by performing an FFT on an 'FFT candidate section' according to an embodiment of the present invention.
Figure 5B:
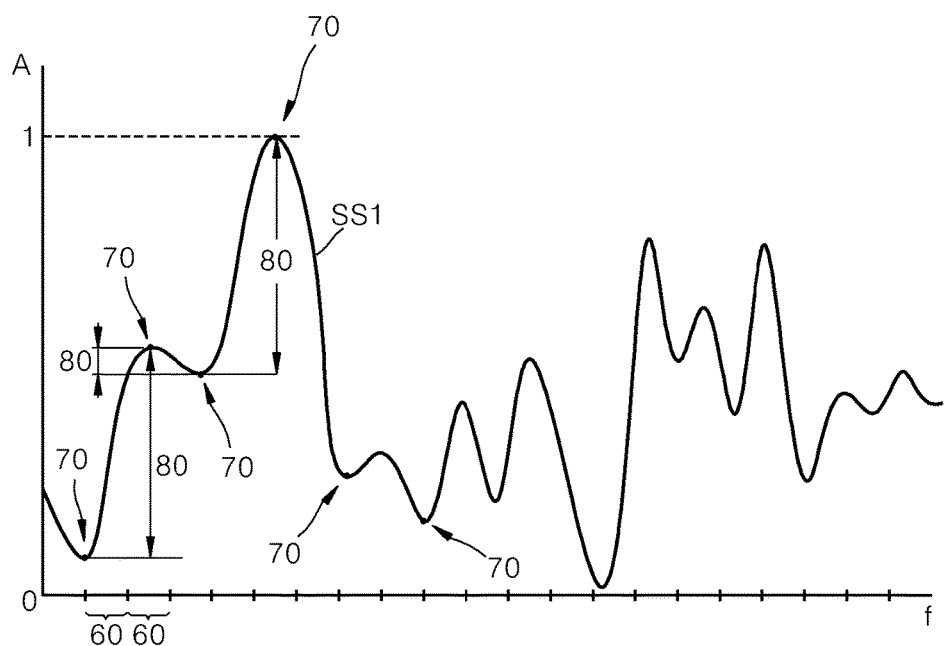
FIG. 5B is a graph showing an N-FFT signal, which is a normalized frequency signal obtained by normalizing the FFT signal according to an embodiment of the present invention.
Figure 5C:
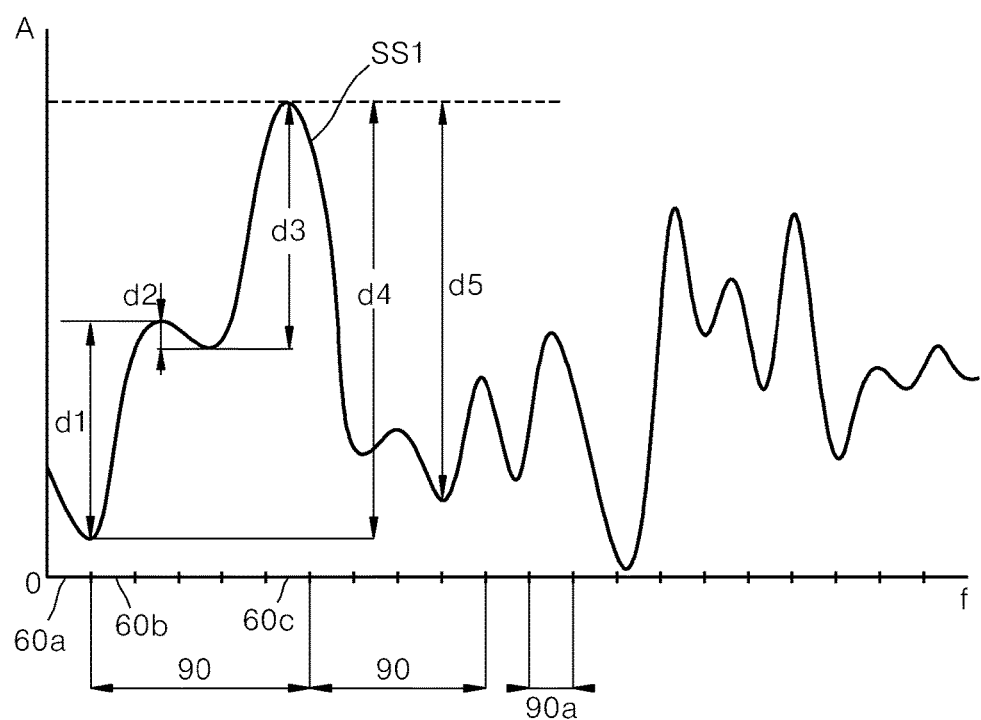
FIG. 5C shows a part of the 'N-FFT signal'.

FIG. 5A is a graph showing an 'FFT signal' obtained by performing an FFT on an 'FFT candidate section' according to an embodiment of the present invention, FIG. 5B is a graph showing an N-FFT signal, which is a normalized frequency signal obtained by normalizing the FFT signal according to an embodiment of the present invention, and FIG. 5C shows a part of the 'N-FFT signal'. The horizontal axis of each graph represents the frequency f, and the vertical axis represents the amplitude A.

In step S19, the FFT signal SS1 which is a signal in the frequency domain obtained by performing the FFT on the FFT candidate section may be calculated.

In step S20, the maximum value MAX and the minimum value MIN may be detected for the FFT signal SS1.

In step S21, it may be determined whether the maximum value is equal to or greater than a predetermined first reference value.

At this time, if the maximum value is equal to or greater than the predetermined first reference value, 'F' may be outputted and the section-by-section process may be terminated. Here, 'F' is a symbol indicating that the 'FFT candidate section' is irrelevant to screaming.

Unlike this, if the maximum value is equal to or less than the predetermined first reference value, the process may proceed to step S22.

Step S21 may be performed to exclude cases where the maximum value is larger than a value that may be generated in the case of screaming.

In step S22, the size of the FFT signal SS1 may be normalized such that the maximum value and the minimum value respectively become the maximum value (ex: 1) and the minimum value (ex: 0) of the first predetermined normalization interval 50. Step S22 may be a step for removing the influence of different background noise environments in each situation.

In step S23, the FFT signal SS1 may be divided into 160 'P intervals 60' along the frequency axis f. At this time, an array having 160 elements representing each 'P section' may be defined.

In step S24, the inflection point 70 of the 'FFT signal SS1' is searched to define the frequency value and the size of the inflection point 70 as a 'key point', and to store it in the 'first key index' point array'.

In step S25, the difference in size between two consecutive 'key points' on the frequency axis f may be defined as a depth 80 and stored in a 'first depth array'.

In this case, if the maximum value and the minimum value of the predetermined first normalization interval 50 are defined as 1 and 0, respectively, the 'depth' may have a value from −1 to 1. And, the 'depth' may be related to the magnitude of the energy at the corresponding frequency.

In step S26, by removing a pair of 'key points' having an absolute value of depth (for example, d2) smaller than a predetermined second reference value from the 'first depth array', it is possible to update the 'first depth array'.

At this time, the depth d4 may be redefined from the elements belonging to the updated first depth array, and the redefined depth may be stored in a 'second depth array'.

In step S27, it is possible to define the 'P intervals' existing between two consecutive 'key points' having an absolute value of depth equal to or greater than a predetermined third reference value as a valid 'valid P interval 90'. At this time, a plurality of valid P sections may be defined. Each of the 'valid P intervals 90' may include one or more 'P intervals'. For example, if the depth between two key points existing in the P section 60*b* having the index 2 and the P section 60*c* having the index 6 is equal to or greater than the third reference value, it may be considered that the P sections of the indices 2 to 6 belong to one "valid P section". In this case, the index 2 and the index 6 may mean the second P interval and the sixth P interval of the 'FFT signal SS1', respectively.

In step S28, the 'valid P interval' (for example, interval 90*a*) where the depth of the plurality of 'valid P intervals 90' is smaller than a predetermined fourth reference value may be partially normalized so that the maximum value M1 and the minimum value m1 of the 'N-FFT signal' within the interval have the maximum value MAX1 and the minimum value MIN1 of the predetermined partial normalization interval, respectively.

At this time, the size of the key point included in the 'partially normalized valid P section' is updated to the partial normalized value and may be stored in the 'second key point array', and the keypoints included in the remaining section P excluding the partially normalized valid section P may be stored in the 'second key point array' without updating the value.

At this time, the minimum value MIN1 and the maximum value MAX1 of the predetermined partial normalization interval may have values other than 0 and 1, respectively. For example, the minimum value MIN1 and the maximum value MAX1 of the predetermined partial normalization interval may be 0.2 and 0.8, respectively. The reason for performing the partial normalization is to perform the analysis described below.

Figure 6:
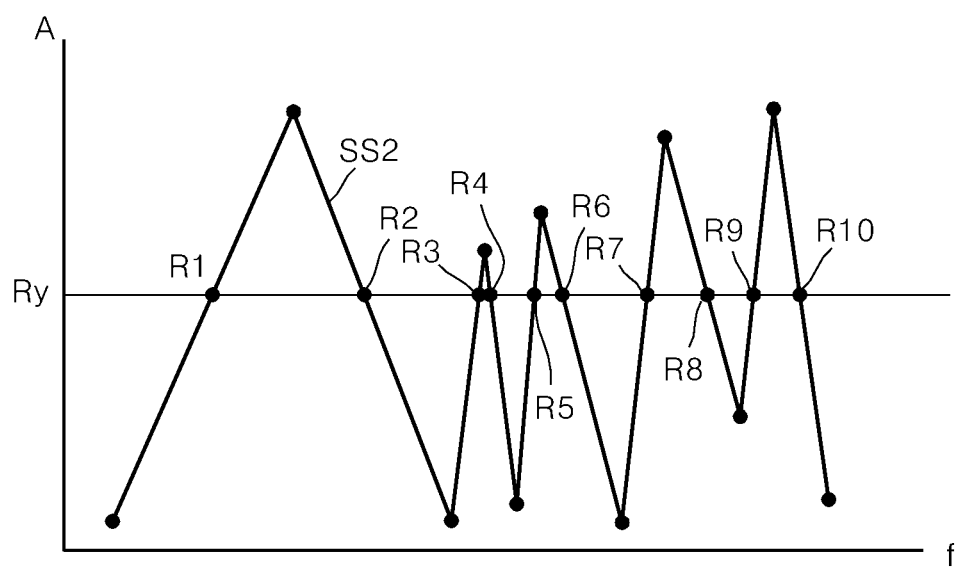
FIG. 6 is a graph showing a reconstructed 'S-FFT signal SS2' according to an embodiment of the present invention.

In step S29, the reconstructed 'S-FFT signal SS2' may be generated by connecting 'key points' stored in the 'second key point array'. FIG. 6 is a graph showing a reconstructed 'S-FFT signal SS2' according to an embodiment of the present invention. At this time, the horizontal axis of the reconstructed S-FFT signal SS2 graph represents frequency f, and the vertical axis represents amplitude A. In FIG. 6, for convenience, each 'key point' is connected by a straight line, but it may be connected by a curve.

If the steps S26 to S29 are performed, the graph of the FFT signal may be smoothed and changed into a more simple graph, and an example of such a simple changed graph is the above-described S-FFT signal SS2.

In step S30, a point having a predetermined fifth reference value among the reconstructed 'S-FFT signals SS2' may be referred to as a 'Reference amplitude crossing point (R-crossing point)'. Then, it is possible to check the number of 'R-crossing points'. At this time, the predetermined fifth reference value may mean any one of the values of the range that the 'S-FFT signal SS2' may have. For example, in FIG. 6, the predetermined fifth reference value may be Ry, and the 'R-crossing point' may include R1 to R10.

In step S31, it may be determined whether the number of 'R-crossing points' satisfies a predetermined third condition. That is, if the number of 'R-crossing points' is smaller than the predetermined second number, 'F' may be outputted and the section-by-section process may be terminated. Here, 'F' is a symbol indicating that the 'FFT candidate section' is irrelevant to screaming.

Unlike this, if the number of R-crossing points is greater than the predetermined second number, step S32 may be performed.

FIG. 2C shows a third execution step according to an embodiment of the present invention.

In step S32, 160 'P sections 60' defined in the 'FFT signal SS1' are divided into 10 sections along the frequency axis f, respectively. Thus, the 'FFT signal SS1' may be divided into a total of 1600 sub-P sections 120.

Figure 7A:
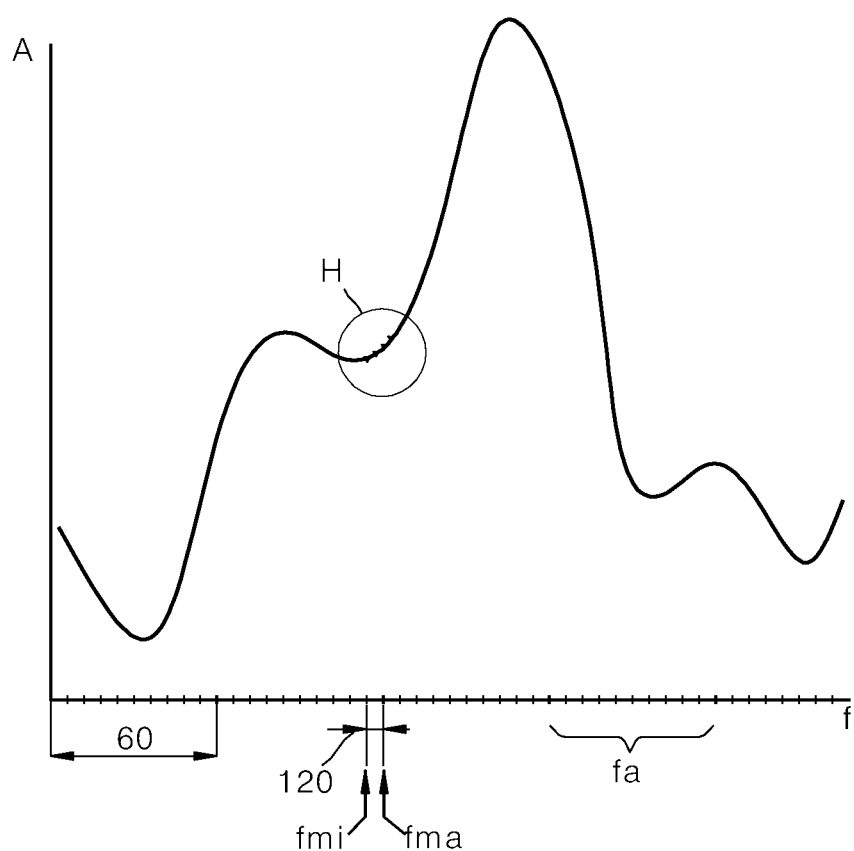
FIG. 7A shows a part of a graph obtained by dividing each P section into 10 'sub-P sections' in the graph of FIG. 5B.
Figure 7B:
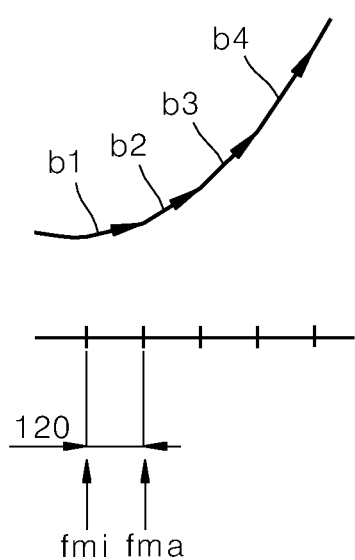
FIG. 7B is an enlarged view of a portion H in FIG. 7A according to an embodiment of the present invention.

FIG. 7A shows a part of a graph obtained by dividing each P section into 10 'sub-P sections' in the graph of FIG. 5B. FIG. 7B is an enlarged view of a portion H in FIG. 7A according to an embodiment of the present invention. The definitions of the horizontal and vertical axes in the graph of FIG. 7A are the same as those of FIG. 5B.

For each 'sub-P interval 120', the minimum frequency fmi and the maximum frequency fma may be defined. In this case, the minimum frequency fmi may mean the frequency of the sub-P section start point in each sub-P section, and the maximum frequency fma may mean the frequency of the sub-P section end point in each 'sub-P section 120'.

In step S33, for each 'sub-P interval 120', by using the value of the FFT signal SS1 at the minimum frequency fmi and the value of the FFT signal SS1 at the maximum frequency fma, vectors b1 to b4 may be generated. Since the total number of 'sub-P sections' is 1,600, a total of 1,600 vectors may be generated.

The reason for using the vector in the present invention is that the calculation time for scream detection may be shortened.

At this time, the energy of an arbitrary first frequency band fa may be calculated by adding the absolute value of the vertical axis value of the vectors included in the arbitrary first frequency band among 1,600 vectors.

In step S34, it may be determined whether the 'energy pattern between specific frequency bands' satisfies a predetermined fourth condition. For example, it may be determined whether the 'energy ratio between specific frequency bands' satisfies the predetermined fourth condition. At this time, the specific frequency bands may mean [2 Khz−Δf1, 2 Khz−Δf1] and [6 Khz−Δf2, 6 Khz+Δf2], for example.

Figure 8:
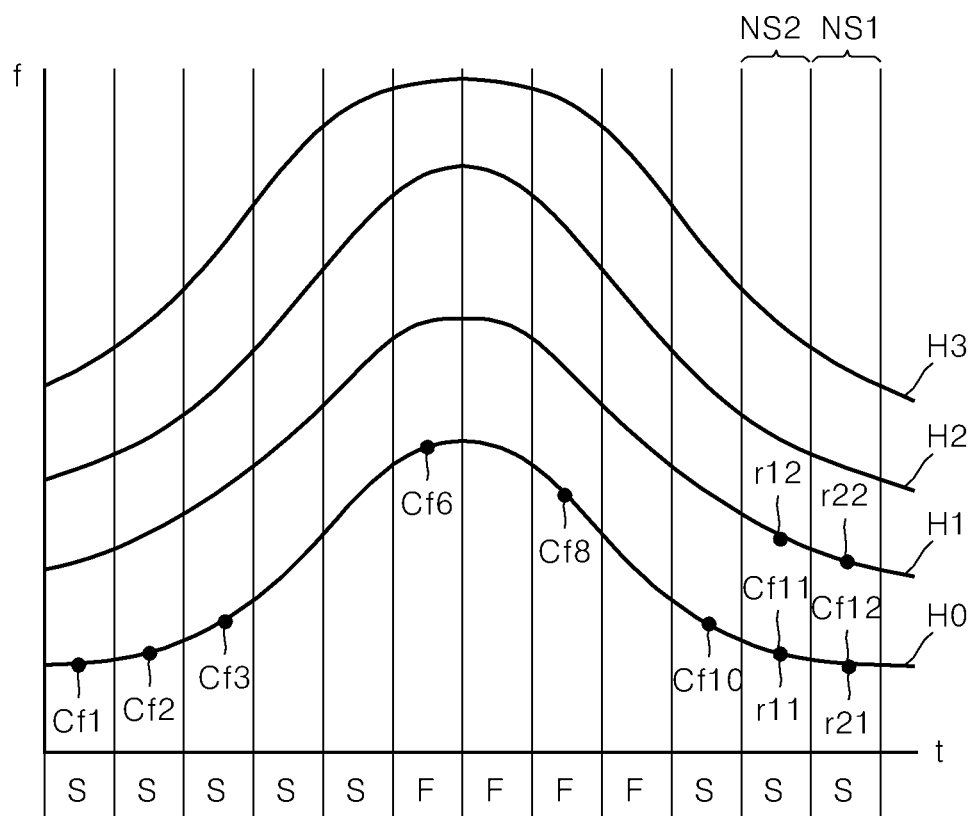
FIG. 8 is an example showing a frequency component value that may be detected over time on a time-frequency plane when screaming occurs.

FIG. 8 is an example showing a frequency component value that may be detected over time on a time-frequency plane when screaming occurs. The horizontal axis of the graph represents time t, and the vertical axis represents frequency f. The generated scream may contain strong energy in the fundamental frequency band H0, the first harmonic band H1, the second harmonic band H2, the third harmonic band H3, and the fourth harmonic band H4.

In this case, a frequency component indicated by a solid line in FIG. 8 indicates a band having an energy level above a predetermined sixth level, and the other region indicates a band having energy below the predetermined sixth level. However, unlike FIG. 8, a point having a concentration proportional to the magnitude of the energy included in the specific frequency of the vertical axis at a specific time on the horizontal axis may be displayed at the intersection of the specific time and the specific frequency.

In step S35, it is possible to determine whether the energy pattern of the frequency bands in the section NS1 to be currently determined is continuous on the time axis with respect to the energy pattern of the frequency bands in the immediately preceding section NS2 defined immediately before.

For example, when the center frequency of the band having the above-mentioned energy of the sixth level or higher is cf11 in the immediately preceding section NS2, and the center frequency of the band having the predetermined energy level of the sixth or higher level is cf12 in the section to be currently determined, it is possible to determine whether cf11-cf12 is smaller than a predetermined seventh reference value. At this time, if cf11-cf12 are larger than the predetermined seventh reference value, 'F' may be outputted and the section-by-section process may be terminated. Here, 'F' is a symbol indicating that the current determination target is not related to screaming.

Unlike this, if cf11-cf12 are smaller than the predetermined seventh reference value, it may be determined that the energy pattern of the frequency bands in the section NS1 has continuously changed with respect to the energy pattern of the frequency bands in the section NS2 and the next step may be executed.

Then, step S35_1 may be executed under the following conditions. That is, the energy ratio between the bands r11 and r12 having an energy of the predetermined sixth level or higher in the immediately preceding section NS2 may be defined as E1. Then, the energy ratio between the bands r21 and r22 having an energy of the predetermined sixth level or higher in the section NS1, that is, the current determination target, may be defined as E2. At this time, it may be determined whether E1-E2 are smaller than a predetermined eighth reference value. At this time, if E1-E2 are larger than the predetermined eighth reference value, the corresponding section may be determined as F and the section-by-section process may be terminated. Here, 'F' is a symbol indicating that the section NS1, that is, the current determination target, is irrelevant to screaming.

Unlike this, if E1-E2 are smaller than the predetermined eighth reference value, it may be determined as 'S (Scream)'. Here, 'S' is a symbol indicating that 'scream information is included' in the section NS1, which is the current determination target.

The step S34, the step S35 and the step S35-1 described above may be collectively defined as a step of determining whether or not the energy pattern of the predetermined frequency bands satisfies the predetermined fifth condition.

Through the above process, a value of 'F' or 'S' may be allocated to each section that is a determination target. That is, in order to determine that the screaming information is contained in the section to be determined (S), it is necessary to pass the steps S10 to S36, and if any one of the steps fails, it is determined that the section to be determined is not related to the scream (F).

<Scream Recognition Process>

FIG. 2D illustrates a scream recognition process, which is a fourth execution step, according to an embodiment of the present invention.

In step S36, it is possible to confirm whether or not screaming information is included in each of the N past sections, which is a predetermined third number, based on the current determination target section NS1. At this time, when screaming generally occurs, the N may mean the average number of sections included during the time that the screaming is maintained. N may be preset by the user.

In step S37, it is determined whether or not the number of sections including screaming information among the N past sections is M or less. At this time, M is less than or equal to N. If the number of sections including the scream information is M or less, it may be finally determined that there is no scream in the N past sections and the scream recognition process may be terminated.

Unlike this, if the number of sections including the scream information is not less than M, step S39 may be executed.

In step S38, it is possible to determine whether there are P or more consecutive sections that do not contain screaming information among the N past sections. At this time, if there are P or more consecutive sections that do not contain screaming information of N past sections, it may be possible to finally determine that no scream exists in the N past sections, and the scream recognition process may be terminated.

for example, when 'S (scream)' is defined as indicating a section determined to be screaming and 'F(false)' is defined as indicating a section determined not to be screaming, if N=11 and P=4, since there are four or more consecutive sections F that do not contain screaming information among the 11 sections, it may be determined that the screaming information is not included, it is determined that the screaming information is not included so that the scream recognition process may be terminated.

Unlike this, if there are not more than P consecutive sections that do not contain screaming information among the N past sections, step S40 may be executed.

In step S39, it is possible to determine whether the center frequencies cf1 to cf12 of the fundamental frequency band H0, where the energy is concentrated, among the N previous sections increase from the past to the present and then decrease. At this time, if it is determined that the center frequency of the fundamental frequency band H0 does not increase from the past to the present and then decreases, it is possible to finally determine that no scream exists in the N past sections and the scream recognition process may be terminated.

Unlike this, when the center frequency of the fundamental frequency band increases from the past to the present and then decreases, step S40 may be executed.

In step S40, it is possible to determine whether the time duration during which the enter frequency has been decreased is longer than the time duration during which the center frequency has been increased. At this time, if it is determined that the time duration during which the enter frequency has been decreased is shorter than the time duration during which the center frequency has been increased, it is possible to finally determine that no scream exists in the N past sections and the scream recognition process may be terminated.

Unlike this, if it is determined that the time duration during which the enter frequency has been decreased is longer than the time duration during which the center frequency has been increased, it may be finally determined that a scream has occurred (step S41)

Through the process so far, it is possible to finally determine whether screaming occurs every time the respective sections to be determined are analyzed. That is, in order to finally determine whether screaming occurs, it is necessary to pass the steps S37 to S42, and if any one of these steps fails, it is not determined that screaming occurs.

Figure 9:
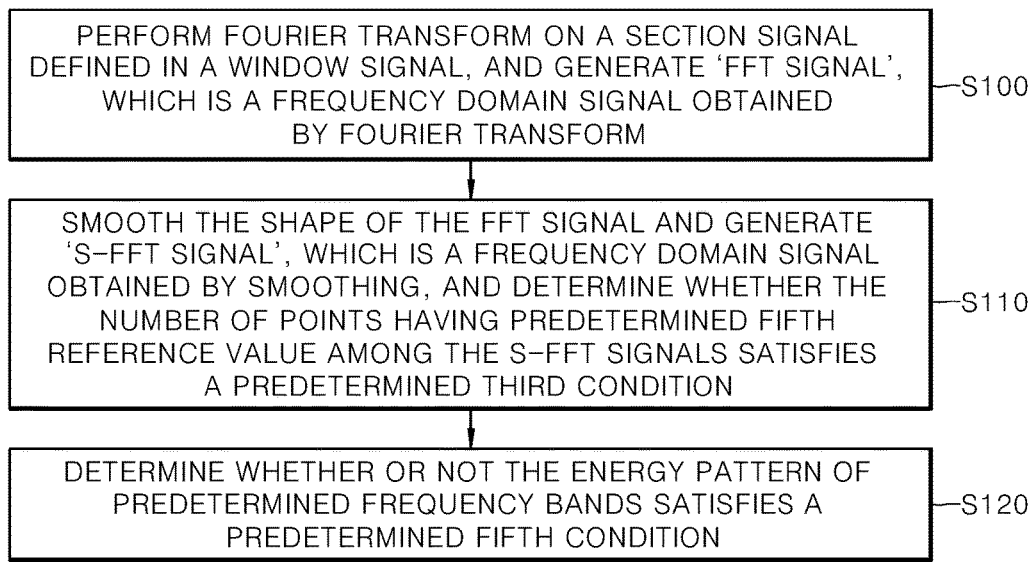
FIG. 9 shows a section-by-section process according to an embodiment of the inventive concept.

FIG. 9 shows a section-by-section process according to an embodiment of the present invention.

In step S100, a Fourier transform may be performed on the section signal defined in the window signal, and an FFT signal, which is a frequency domain signal obtained by the Fourier transform, may be generated.

In step S110, the shape of the FFT signal is smoothed, and an S-FFT signal, which is a frequency domain signal obtained by the smoothing, may be generated, and it is possible to determine whether the number of points having a predetermined fifth reference value among the S-FFT signals satisfies a predetermined third condition.

In step S120, it may be determined whether or not the energy pattern of the predetermined frequency bands satisfies a predetermined fifth condition.

In this case, the step of determining whether the fifth condition is satisfied is performed only when the third condition is satisfied, and only when the fifth condition is satisfied, it determines that the section signal includes a signal corresponding to a scream, and if not, it determines that the section signal does not include a signal corresponding to screaming.

Figure 10:
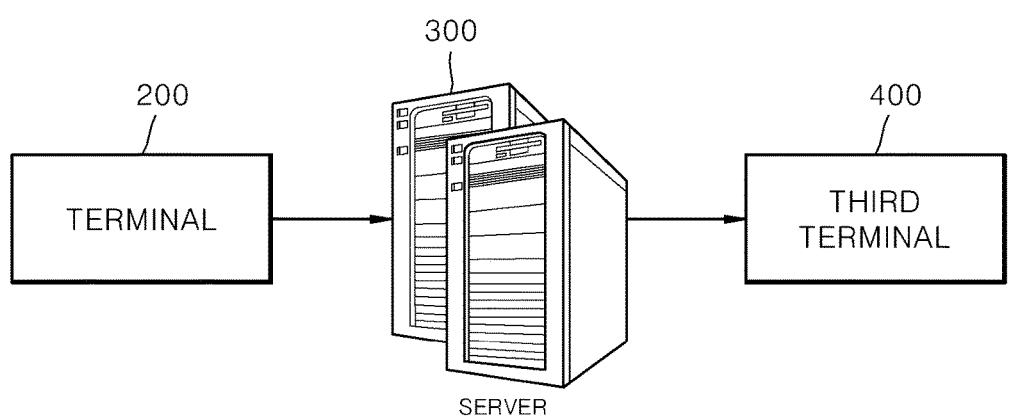
FIG. 10 shows a scream detection system according to an embodiment of the present invention.

FIG. 10 shows a scream detection system according to an embodiment of the present invention.

A subscriber of a screaming detection exclusive app may execute the screaming detection exclusive app in a terminal 200. After the terminal 200 collected audio signal through a microphone of the terminal, the terminal can determine in real time whether or not a scream has occurred using the collected audio signal. At this time, if the terminal determines that a scream has occurred, the terminal can transmit information regarding the scream to a server 300. Information of a specific person designated in advance, 911, or police stations may be registered in the server 300 so that the information can be used in case that the subscriber is in a dangerous situation. When the server receives information indicating that a screaming has been detected from the terminal 200, the server 300 may be configured to transmit the fact that a scream has occurred to a third terminal 400. The third terminal 400 may be a terminal of a specific person designated in advance as described above, or may correspond to a terminal or a telephone of a safety report center, a police station, and so on.

It will be apparent to those skilled in the art that various modifications and variations may be made in the present invention without departing from the spirit or essential characteristics thereof. The contents of each claim may be combined with other claims without departing from the scope of the claims.

What is claimed is:

1. A method for transmitting information of an occurrence of a human scream, comprising:
   collecting, by a terminal, an audio signal through a microphone of the terminal;
   selecting from the collected audio signal, by the terminal, consecutive window signals with a window having a predetermined time length, each of the window signals having two distinct sections;
   performing, by the terminal, a section-by-section process to determine whether a section includes a signal corresponding to a human scream;
   performing, by the terminal, a scream recognition process; and
   if the terminal determines that a human scream has occurred, transmitting, by the terminal, information indicating that a human scream has been detected to a server which is configured to transmit a fact that a scream has occurred to a third terminal;
   wherein,
   the section-by-section process is executed on each of N number of section signals that are consecutively defined in a time domain to determine whether each of the N number of section signals comprises a signal corresponding to a human scream, and wherein
   the scream recognition process comprises:
      determining if there are P or more consecutive sections that do not contain screaming information among the N number of section signals,
      when it is determined that there are not P or more consecutive sections that do not contain screaming information among the N number of section signals, determining if a center frequency of a fundamental frequency band in which energy is concentrated among the N number of section signals has been increased and then decreased from past to present, and
      when it is determined that the center frequency has been increased and then decreased from past to present, determining that a human scream has occurred only when the time duration during which the center frequency has been decreased is longer than the time duration during which the center frequency has been increased.

2. The method of claim 1, wherein
the section-by-section process comprises:
   performing a Fourier transform on a section signal defined in the window signal to generate a FFT signal, which is a frequency domain signal obtained by the Fourier transform;
   normalizing a size of the FFT signal,
   smoothing a shape of the FFT signal to generate a S-FFT signal which is a frequency domain signal obtained by the smoothing; and
   determining whether a number of points of the S-FFT signal each of which has an amplitude value selected from amplitude values of the S-FFT signal is less than a predetermined number.

3. The method of claim 2, wherein the section-by-section process further comprises: determining whether a maximum value of the FFT signal is less than or equal to a predetermined value between the performing the Fourier transform and the normalizing,
   wherein the normalizing is performed only when the maximum value of the FFT signal is equal to or less than the predetermined first value.

4. The method of claim 1, wherein
the scream recognition process further comprises:
   determining whether there are M or more number of section signals including information on a human scream of a person among the N number of section signals (where N>M); and
   the determining if there are P or more consecutive sections that do not contain screaming information among the N number of section signals is performed only when it is determined that there are the M or more section signals including information on a human scream of a person among the N number of section signals.

5. A device for transmitting information of an occurrence of a human scream, including a processing unit,
   wherein the processing unit is configured to
   collect an audio signal through a microphone of the device;
   select from the collected audio signal consecutive window signals with a window having a predetermined time length, each of the window signals having two distinct sections;
   perform a section-by-section process to determine whether a section includes a signal corresponding to a human scream;
   performing a scream recognition process; and
   if the device determines that a human scream has occurred, transmit information indicating that a human scream has been detected to a server which is configured to transmit a fact that a scream has occurred to a third terminal;
   wherein,
   the section-by-section process is executed on each of N number of section signals that are consecutively defined in a time domain to determine whether each of the N number of section signals comprises a signal corresponding to a human scream, and the scream recognition process comprises:

determining if there are P or more consecutive sections that do not contain screaming information among the N number of section signals, when it is determined that there are not P or more consecutive sections that do not contain screaming information among the N number of section signals, determining if a center frequency of a fundamental frequency band in which energy is concentrated among the N number of section signals has been increased and then decreased from past to present, and when it is determined that the center frequency has been increased and then decreased from past to present, determining that a human scream has occurred only when the time duration during which the center frequency has been decreased is longer than the time duration during which the center frequency has been increased.

* * * * *